United States Patent
Huang et al.

(10) Patent No.: US 10,695,993 B2
(45) Date of Patent: Jun. 30, 2020

(54) IN-SITU POLYMERIZATION OF POLYAMIDES FOR COMPOSITE PART REPAIR

(71) Applicants: GM Global Technology Operations LLC, Detroit, MI (US); Teijin Limited, Osaka (JP)

(72) Inventors: Xiaosong Huang, Novi, MI (US); Tomohiro Ryutani, Rochester, MI (US); Takashi Goto, Waterford, MI (US)

(73) Assignees: GM GLOBAL TECHNOLOGY OPERATIONS LLC, Detroit, MI (US); TEIJIN LIMITED, Osaka (JP)

( * ) Notice: Subject to any disclaimer, the term of this patent is extended or adjusted under 35 U.S.C. 154(b) by 191 days.

(21) Appl. No.: 15/397,356

(22) Filed: Jan. 3, 2017

(65) Prior Publication Data

US 2017/0203524 A1 Jul. 20, 2017

Related U.S. Application Data

(60) Provisional application No. 62/279,567, filed on Jan. 15, 2016.

(51) Int. Cl.
*B29C 73/02* (2006.01)
*B29C 73/10* (2006.01)
(Continued)

(52) U.S. Cl.
CPC .............. *B29C 73/02* (2013.01); *B29C 73/10* (2013.01); *C08J 5/04* (2013.01); *C08J 5/24* (2013.01);
(Continued)

(58) Field of Classification Search
CPC ..... B29C 73/02; B29C 73/10; B29C 35/0805; C08J 5/04; C08J 5/24
See application file for complete search history.

(56) References Cited

U.S. PATENT DOCUMENTS

| 3,837,965 A | 9/1974 | Mahon et al. |
| 4,409,270 A | 10/1983 | Faber et al. |

(Continued)

FOREIGN PATENT DOCUMENTS

| CN | 1258247 A | 6/2000 |
| CN | 101535823 A | 9/2009 |

(Continued)

OTHER PUBLICATIONS

U.S. Appl. No. 14/815,531, filed Jul. 31, 2015, Huang et al.
(Continued)

*Primary Examiner* — Jeffry H Aftergut
*Assistant Examiner* — Jaeyun Lee
(74) *Attorney, Agent, or Firm* — Harness, Dickey & Pierce, P.L.C.

(57) ABSTRACT

Methods of repairing defects in polymeric composite structures are provided. The methods include filling or bonding defects with a pre-polymerization solution and polymerizing the pre-polymerization solution in situ. Patches or support structures can be disposed at the site of the defect to increase the strength of the repair or to make the repair cosmetically pleasing, respectively. Such a method of repairing a defect may include applying a pre-polymer solution having a reinforcing material and a monomer to the defect in a polymeric composite structure; disposing a support structure on a surface of the polymeric composite structure over at least a portion of the defect having the applied pre-polymer solution; and polymerizing the monomer in the pre-polymer solution to form a repaired region in the polymeric composite structure including a polymer having the reinforcing material distributed therein.

18 Claims, 3 Drawing Sheets

(51) Int. Cl.
*C08J 5/04* (2006.01)
*C08J 5/24* (2006.01)
*B29C 73/06* (2006.01)
*B29K 77/00* (2006.01)
*B29K 105/00* (2006.01)

(52) U.S. Cl.
CPC .......... *B29C 73/06* (2013.01); *B29K 2077/00* (2013.01); *B29K 2105/0002* (2013.01); *B29K 2105/0005* (2013.01); *C08J 2377/02* (2013.01)

(56) References Cited

U.S. PATENT DOCUMENTS

| | | | |
|---|---|---|---|
| 4,434,832 A | 3/1984 | Koch et al. | |
| 4,472,473 A * | 9/1984 | Davis | E04C 2/322 428/182 |
| 4,485,135 A | 11/1984 | Koch | |
| 4,865,674 A | 9/1989 | Durkin | |
| 4,948,443 A | 8/1990 | Speer | |
| 5,024,818 A | 6/1991 | Tibbetts et al. | |
| 5,829,716 A | 11/1998 | Kirkwood et al. | |
| 5,833,795 A * | 11/1998 | Smith | B29C 73/02 156/272.4 |
| 5,853,865 A | 12/1998 | McHugh et al. | |
| 6,039,824 A | 3/2000 | Van Haandel | |
| 6,200,686 B1 | 3/2001 | Ozaki et al. | |
| 6,206,067 B1 | 3/2001 | Kociemba et al. | |
| 6,468,372 B2 | 10/2002 | Kociemba et al. | |
| 6,781,099 B2 | 8/2004 | Krah | |
| 6,843,945 B1 | 1/2005 | Lee et al. | |
| 6,872,294 B2 | 3/2005 | Lee et al. | |
| 6,875,471 B2 | 4/2005 | Lee et al. | |
| 6,911,169 B2 | 6/2005 | Kwag et al. | |
| 7,846,366 B2 | 12/2010 | Iobst et al. | |
| 7,981,501 B2 | 7/2011 | Kwag et al. | |
| 8,043,543 B2 | 10/2011 | Wang et al. | |
| 8,309,644 B1 | 11/2012 | Huang | |
| 8,449,810 B2 | 5/2013 | Rousseau | |
| 8,475,884 B2 | 7/2013 | Kia | |
| 8,486,321 B2 | 7/2013 | Kia | |
| 8,545,650 B2 | 10/2013 | Evens et al. | |
| 8,597,562 B2 | 12/2013 | Wang et al. | |
| 8,641,957 B2 | 2/2014 | Atkins et al. | |
| 8,668,247 B2 | 3/2014 | Kia et al. | |
| 8,814,255 B2 | 8/2014 | Yamaji et al. | |
| 8,840,827 B2 | 9/2014 | Iobst et al. | |
| 8,852,733 B2 | 10/2014 | Kwag et al. | |
| 8,882,183 B2 | 11/2014 | Suzuki et al. | |
| 8,946,342 B2 | 2/2015 | Konagai et al. | |
| 8,991,900 B2 | 3/2015 | Yamaji et al. | |
| 9,017,499 B2 | 4/2015 | Evens et al. | |
| 9,054,387 B2 | 6/2015 | Viavattine et al. | |
| 9,132,859 B2 | 9/2015 | Yamaji et al. | |
| 9,475,238 B2 | 10/2016 | Suhara et al. | |
| 9,878,502 B2 | 1/2018 | Helfrich et al. | |
| 10,160,172 B2 | 12/2018 | Huang et al. | |
| 2004/0131769 A1 | 7/2004 | Saxon | |
| 2006/0057335 A1 | 3/2006 | Wang et al. | |
| 2006/0148590 A1 | 7/2006 | Sullivan et al. | |
| 2006/0158001 A1 | 7/2006 | Emch et al. | |
| 2008/0128078 A1 | 6/2008 | May et al. | |
| 2010/0136866 A1 | 6/2010 | Kwag et al. | |
| 2011/0021737 A1 * | 1/2011 | Tadepalli | B29C 70/36 528/26 |
| 2012/0107509 A1 * | 5/2012 | Scherzer | B29C 67/246 427/381 |
| 2012/0211144 A1 | 8/2012 | Litzenberger et al. | |
| 2012/0213997 A1 | 8/2012 | Wang et al. | |
| 2013/0089733 A1 | 4/2013 | Raghavan et al. | |
| 2013/0122262 A1 | 5/2013 | Nagakura et al. | |
| 2013/0149501 A1 | 6/2013 | Pacchione et al. | |
| 2013/0272780 A1 | 10/2013 | Takeuchi et al. | |
| 2013/0309001 A1 | 11/2013 | Teshima et al. | |
| 2013/0344282 A1 | 12/2013 | Yagi et al. | |
| 2014/0004308 A1 | 1/2014 | Taniguchi et al. | |
| 2014/0039114 A1 | 2/2014 | Hagihara et al. | |
| 2015/0001768 A1 | 1/2015 | Kia et al. | |
| 2015/0108793 A1 | 4/2015 | Peschansky et al. | |
| 2015/0328847 A1 * | 11/2015 | Kia | B29C 35/0805 427/559 |
| 2016/0039157 A1 * | 2/2016 | Huang | B29C 65/04 156/94 |
| 2017/0001389 A1 | 1/2017 | Engel et al. | |
| 2017/0066200 A1 * | 3/2017 | Zhang | B29C 67/246 |
| 2017/0305044 A1 | 10/2017 | Terasaka et al. | |
| 2017/0313002 A1 | 11/2017 | Huang et al. | |
| 2018/0361690 A1 | 12/2018 | Huang et al. | |

FOREIGN PATENT DOCUMENTS

| | | |
|---|---|---|
| CN | 102574329 A | 7/2012 |
| CN | 102574339 A | 7/2012 |
| CN | 104275811 A | 1/2015 |
| CN | 105365232 A | 3/2016 |
| CN | 106976256 A | 7/2017 |
| CN | 107336449 A | 11/2017 |
| CN | 109109348 A | 1/2019 |
| DE | 4019744 A1 | 1/1992 |
| DE | 102005011977 A1 | 2/2006 |
| DE | 102007026099 A1 | 12/2008 |
| DE | 102011014017 A1 | 9/2012 |
| DE | 102011076463 A1 | 11/2012 |
| DE | 102012207468 A1 | 11/2013 |
| DE | 102013112933 A1 | 5/2015 |
| DE | 102015112874 A1 | 2/2016 |
| DE | 102015008312 A1 | 1/2017 |
| DE | 102017100509 A1 | 7/2017 |
| DE | 102013004232 B4 | 8/2017 |
| DE | 102017109362 A1 | 11/2017 |
| DE | 102016115284 A1 | 2/2018 |
| DE | 102018114194 A1 | 12/2018 |
| EP | 0429827 A2 | 6/1991 |
| EP | 1755871 A2 | 2/2007 |
| FR | 2742691 A1 | 6/1997 |
| FR | 2981882 A1 | 5/2013 |
| FR | 3050684 A1 | 11/2017 |
| JP | S58191123 A | 11/1983 |
| JP | S59223784 A | 12/1984 |
| JP | 2000143743 A | 5/2000 |
| JP | 2002511030 A | 4/2002 |
| JP | 3294808 B2 | 6/2002 |
| JP | 2002294160 A | 10/2002 |
| JP | 20061125 A | 1/2006 |
| JP | 2009143985 A | 7/2009 |
| JP | 2010137527 A | 6/2010 |
| JP | 2013503763 A | 2/2013 |
| JP | 2013512808 A | 4/2013 |
| JP | 2013525949 A | 6/2013 |
| JP | 2014188995 A | 10/2014 |
| JP | 2017141437 A | 8/2017 |
| JP | 2017206685 A | 11/2017 |
| WO | WO-1994012338 A1 | 6/1994 |
| WO | WO-2008036786 A2 | 3/2008 |
| WO | WO-2012102315 A1 | 8/2012 |
| WO | WO-2012105080 A1 | 8/2012 |
| WO | WO-2012105387 A1 | 8/2012 |
| WO | WO-2012105389 A1 | 8/2012 |
| WO | WO-2012105716 A1 | 8/2012 |
| WO | WO-2012105717 A1 | 8/2012 |
| WO | WO-2012108446 A1 | 8/2012 |
| WO | WO-2012117593 A1 | 9/2012 |
| WO | WO-2012140793 A1 | 10/2012 |
| WO | WO-2013113676 A2 | 8/2013 |
| WO | WO-2015087905 A1 | 6/2015 |
| WO | 2016084861 A1 | 6/2016 |

OTHER PUBLICATIONS

U.S. Appl. No. 15/144,625, filed May 2, 2016, Huang et al.
U.S. Appl. No. 15/624,240, filed Jun. 15, 2017, Huang et al.
First Office Action for Chinese Patent Application No. 201710292244.5 dated Dec. 3, 2018 with correspondence dated Dec. 11, 2018 from China Patent Agent (H.K.) Ltd. summarizing contents, 11 pages.

(56) References Cited

OTHER PUBLICATIONS

First Office Action for Chinese Patent Application No. 201710079859.X dated Aug. 28, 2018 with correspondence dated Aug. 31, 2018 from China Patent Agent (H.K.) Ltd. summarizing contents, 12 pages.
First Office Action and Search Report for Japanese Application No. 2017-091003 dated Oct. 2, 2018 with English language machine translation; 12 pages.
He, Z., Satarkar, N., Xie, T., Cheng, Y.-T. and Hilt, J. Z.; "Remote Controlled Multishape Polymer Nanocomposites with Selective Radiofrequency Actuations"; Adv. Mater., 23; 2011; pp. 3192-3196.
A First Office Action in German Application No. 102015112874.8 from the German Patent Office dated Sep. 8, 2016 and correspondence from Manitz, Finsterwald & Partner summarizing the First Office Action; 5 pages.
A First Office Action in Chinese Application No. 201510601690.0 from the Chinese Patent Office dated Mar. 30, 2017; 17 pages.
Huang et al.; U.S. Appl. No. 15/144,625, filed May 2, 2016 entitled "Cosmetic Repair of a Thermoplastic Carbon Fiber Composite"; 44 pages.
Huang et al.; U.S. Appl. No. 15/624,240, filed Jun. 15, 2017 entitled "Heating Elements for Repair of Molding Defects for Carbon Fiber Thermoplastic Composites"; 46 pages.
First Office Action in German Application No. 102017100509.9 from the German Patent Office dated Nov. 27, 2017 and correspondence from Manitz, Finsterwald & Partner summarizing the First Office Action; 6 pages.
First Office Action in German Application No. 102017109362.1 from the German Patent Office dated Mar. 22, 2018 and correspondence from Manitz, Finsterwald & Partner summarizing the First Office Action; 5 pages.
Notification of Reasons for Refusal and First Search Report in Japanese Application No. 2017-003799 from the Japanese Patent Office dated Feb. 1, 2018; 15 pages.
Preliminary Search Report for French Application No. 1753836 dated Mar. 4, 2019 with correspondence from Regimbeau European Patent and Trademark Attorneys dated Mar. 20, 2019 summarzing contents, 11 pages.
First Office Action for German Patent Application No. 1020181141941 dated May 15, 2019 with correspondence from Manitz Finsterwald and Partner dated May 24, 2019 summarizing contents, 6 pages.
Second Office Action for German Patent Application No. 102017100509.9 dated Jan. 15, 2020 with correspondence dated Jan. 29, 2020 from Manitz Finsterwald and Partner summarizing contents, 6 pages.

\* cited by examiner

IN-SITU POLYMERIZATION OF POLYAMIDES FOR COMPOSITE PART REPAIR

CROSS-REFERENCE TO RELATED APPLICATIONS

This application claims the benefit of U.S. Provisional Application No. 62/279,567 filed on Jan. 15, 2016. The entire disclosure of the application referenced above is incorporated herein by reference.

FIELD

The present disclosure relates to the repair of thermoplastic carbon fiber composites by using in-situ polymerization of polymers.

INTRODUCTION

This section provides background information related to the present disclosure which is not necessarily prior art.

Vehicle bodies desirably manage the loads applied both during normal service conditions, as well as under extraordinary conditions, such as a collision or during exposure to other excessive forces or impact. Increasingly, vehicle bodies are constructed using materials such as polymer-based composites that offer higher strength to weight ratios than the low strength, low carbon steel used in other designs. Polymeric composites in particular are useful in automobiles, and their utilization is expected to continue increasing in the future in an effort to further reduce the vehicle mass. However, polymeric composites may pose greater difficulties when requiring repair in comparison to metal materials. Accordingly, the development of an effective repair method for defects in impact damaged composite structures will remain important.

Automobile parts such as structural panels, truck beds, and bumpers made from polymer composites are preferably designed to resist damage from low speed collisions, impacts from small stones or objects, the weight of a leaning person, and the addition of loads (such as with a truck bed). Nonetheless, with high energy impacts, various scuffs, dents, cracks, and other defects or damage can be formed in the panels, truck beds, and bumpers. Given certain part shapes, dimensions, or the assembly technologies, it is sometimes easier to replace a component than repair it. In most circumstances, repairing a damaged component would be desirable. Accordingly, there remains a need for improved repair techniques for polymer composites

SUMMARY

This section provides a general summary of the disclosure, and is not a comprehensive disclosure of its full scope or all of its features.

The current technology provides a method of repairing a defect in a polymeric composite structure. The method includes applying a pre-polymer solution to the defect in the polymeric composite structure. The pre-polymer solution includes a reinforcing material and a monomer. The method also includes disposing a support structure on a first surface of the polymeric composite structure over at least a portion of the defect having the applied pre-polymer solution; and polymerizing the monomer in the pre-polymer solution to form a repaired region in the polymeric composite structure comprising a polymer having the reinforcing material distributed therein. The method also optionally includes removing the support structure from the first surface of the polymeric composite structure.

In some embodiments, the pre-polymer solution further includes at least one of an initiator or an activator. In yet other embodiments, the pre-polymer solution further includes an initiator and an activator, the monomer is caprolactam, the activator is hexamethylene diisocyanate, and the initiator is caprolactam magnesium bromide.

In various embodiments, the polymeric composite structure has a corrugated surface, and disposing a support structure on the first surface of the polymeric composite structure includes disposing a rigid support structure having a corrugated surface that matches the corrugated surface of the polymeric composite structure.

In various embodiments, the method further includes applying pressure to the support structure prior to and during the polymerizing of the monomer in the pre-polymer solution.

In various embodiments, the polymerizing of the monomer in the pre-polymer solution includes applying heat or light to the pre-polymer solution.

In various embodiments, the polymerizing of the monomer in the pre-polymer solution includes disposing a heat blanket on an exposed surface of the support structure and applying heat generated from the heat blanket to the pre-polymer solution through the support structure.

In various embodiments, the polymeric composite structure includes a polyamide-based polymer composite and the polymerizing of the monomer in the pre-polymer solution generates a polymer including polyamide 6 in situ.

In various embodiments, the method further includes disposing at least one polymeric composite sheet on a second surface of the polymeric composite structure opposite the first surface on which the support structure is disposed.

In various embodiments, the reinforcing material is selected from the group consisting of carbon fibers, glass fibers, chopped fibers, continuous fibers, fabrics, mesh, powder, and combinations thereof.

In various embodiments, the method further includes removing the support structure from the first surface of the polymeric composite structure after the repair region is formed.

In various embodiments, the method further includes, prior to the polymerizing, disposing a first patch onto a second surface of the polymeric composite structure that spans the defect, the second surface being opposite the first surface.

In various embodiments, the method further includes, prior to the disposing a support structure on the first surface, disposing a second patch to the first surface of the polymeric composite structure that spans the defect.

In various embodiments, the defect is a hole and the method further includes disposing a piece of a polymeric composite material within the hole, such that a channel is defined between a first edge of the piece of a polymeric composite material and a second edge of the polymeric composite structure that defines the hole, wherein the channel is filled with the pre-polymer solution after the applying.

In various embodiments, the polymeric composite structure is corrugated, and the disposing a support structure on the first surface of the polymeric composite structure includes disposing a support structure having a corrugated surface that matches the corrugated polymeric composite structure.

The current technology also provides a second method of repairing a defect in a polymeric composite structure. The second method includes exposing a portion of a first polymeric composite panel located immediately adjacent to a section of the polymeric composite structure having the defect; removing the section of the polymeric composite structure having the defect; applying a pre-polymer solution to the portion, wherein the pre-polymer solution includes a reinforcing material and a monomer; disposing a surface of a second polymeric composite panel on the portion of the first polymeric composite panel, wherein the second polymeric composite panel replaces the section of the polymeric composite structure having the defect; and polymerizing the monomer in the pre-polymer solution to generate a third polymeric composite in situ that bonds the second polymeric composite panel to the first polymeric composite panel.

In various embodiments, the method further includes applying pressure to the second polymeric composite panel and the first polymeric composite panel prior to and during the polymerizing.

In various embodiments, the applying pressure includes sealing the second polymeric composite panel and the first polymeric composite panel in vacuum bagging and applying a negative pressure until polymerizing is completed.

In various embodiments, the pre-polymer solution further includes an activator and an initiator and the reinforcing material is selected from the group consisting of carbon fibers, glass fibers, chopped fibers, continuous fibers, fabrics, mesh, powder, and combinations thereof, such that the polymerizing of the monomer in the pre-polymer solution occurs in situ.

Additionally, the current technology provides a third method of repairing a defect in a polymeric composite structure. The method includes applying a pre-polymer solution containing a reinforcing material and a monomer to the defect in the polymeric composite structure; disposing a first patch onto a first surface of the polymeric composite structure that spans the defect; and polymerizing the monomer in the pre-polymer solution by applying heat to the pre-polymer solution.

In various embodiments, the third method further includes disposing a second patch onto a second surface of the polymeric composite structure that spans the defect, wherein the second surface is opposite the first surface.

In various embodiments, the defect is a hole and the third method further includes disposing a piece of a polymeric composite material within the hole such that a channel is defined between a first edge of the piece of a polymeric composite material and a second edge of the polymeric composite structure that defines the hole, wherein the channel is filled with the pre-polymer solution after the applying.

In various embodiments, the third method further comprises disposing a support structure on a second surface of the polymeric composite structure that spans the defect, wherein the second surface is opposite the first surface, such that the support structure is disposed over at least a portion of the second surface with the defect having the applied pre-polymer solution.

In various embodiments, the polymeric composite structure is corrugated, and the disposing a support structure on the second surface of the polymeric composite structure includes disposing a support structure having a corrugated surface that matches the corrugated polymeric composite structure.

The current technology also provides a polymer composite structure repaired according to the third method.

The current technology also provides structures generated according to the above methods, including intermediate structures formed during performance of the method and final structures that are formed after the method is performed.

The current technology also provides a repaired composite structure that includes a polymeric composite panel having a repaired region, the repaired region including a defect filled with a polymer comprising a reinforcing material selected from the group consisting of carbon fibers, glass fibers, chopped fibers, continuous fibers, fabrics, mesh, powder, and combinations thereof, wherein the repaired region has an exposed surface having a grain or pattern that matches a grain or pattern in an exposed surface of the polymeric composite structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
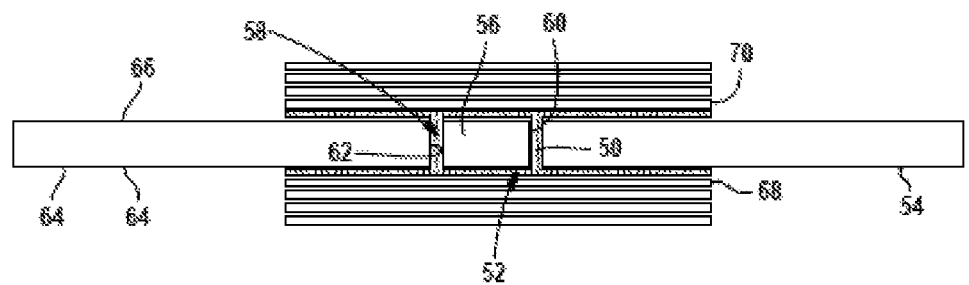
Figure 4:
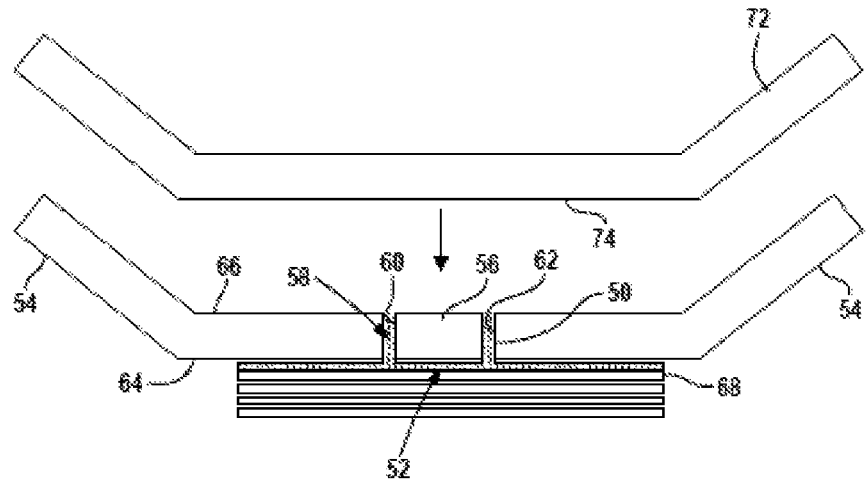

FIG. 3 is an illustration of a third method of repairing a defect in a polymeric composite structure, wherein the defect is a structural defect and wherein repairing the defect includes disposing a first patch and second patch on opposite surfaces of the polymeric composite structure, such that the patches span the defect; and FIG. 4 is an illustration of a fourth method of repairing a defect in a polymeric composite structure, wherein the defect is a structural defect and wherein repairing the defect includes disposing a patch on a first surface of the polymeric composite structure and disposing a rigid support structure on a second opposing surface of the polymeric composite structure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

Polymeric composites are widely used in vehicles, such as automobiles, motorcycles, boats, tractors, buses, mobile homes, campers, and tanks, and their utilization will be increasing in the future with efforts to further reduce vehicle mass. Reinforced composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, the reinforced composites may be used to form automotive structural components having contoured or complex three-dimensional shapes. Non-limiting examples include gas tank protection shields, underbody shields, structural panels, door panels, interior floors, floor pans (e.g., of a cargo van), roofs, exterior surfaces, storage areas, including glove boxes, console boxes, trunks, trunk floors, truck beds, and the like.

Compared to existing metallic materials, polymeric composites require different repair methods. Therefore, the development of effective repair methods for damaged polymeric composite structures is needed. For structural repairs, the formation of a good bond between the parent composite panel and a repair patch ensures recovery of composite performance, including providing adequate strength. For cosmetic repairs, filling materials used to fill in surface defects desirably have a good adhesion with a parent polymeric composite structure to ensure repair durability. Adhesives used for both structural and cosmetic repairs for polymeric composite structures may not reliably provide good mechanical properties, and UV and abrasion resistance. Accordingly, new methods for repairing cosmetic and structural defects in polymeric composite structures are desirable.

In various aspects, the present disclosure provides methods of repairing a defect in a polymeric composite structure with an in situ polymerization of a filling and/or bonding polymer. The defect can be cosmetic, such as a crack, groove, or pit, or the defect can be structural, such a large crack that spans two surfaces of a polymeric composite structure or a hole. The polymeric composite structure can be any structure composed of a polymeric composite on a vehicle, such as a panel. Accordingly, the polymeric composite structure can be a smooth panel, a curved panel, or a corrugated panel, such as a panel used in a truck bed or any of the applications previously discussed above. In certain aspects, the polymer used to repair a defect in the polymeric composite structure is a thermoplastic that may be polymerized in situ. The filling and/or bonding polymer that repairs the defect can include a reinforcing material and may polymerize in situ to have the same polymeric composite composition as the polymeric composite structure or to have a different polymer composite composition as the polymeric composite structure.

Figure 1A:
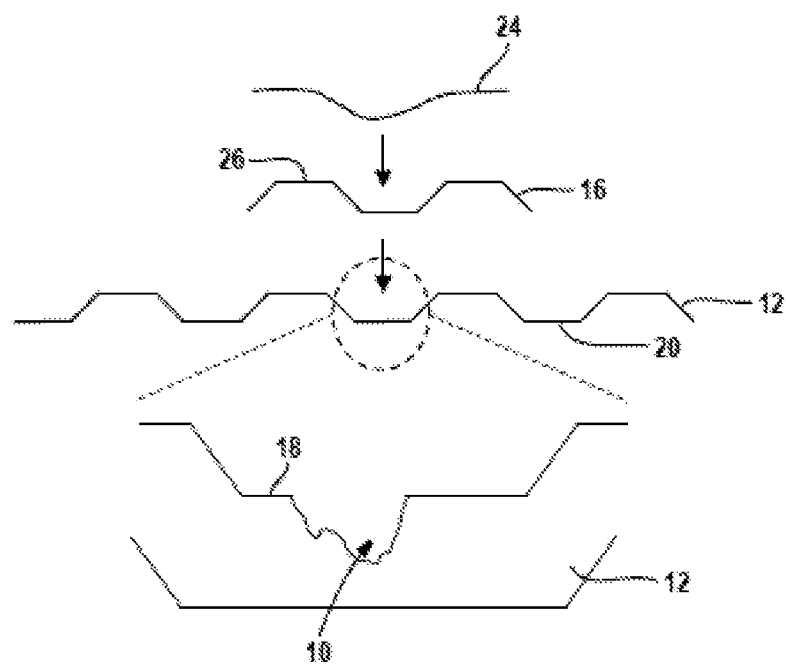
FIG. 1A is an illustration of a first method of repairing a polymeric composite structure according to the present technology.
Figure 1B:
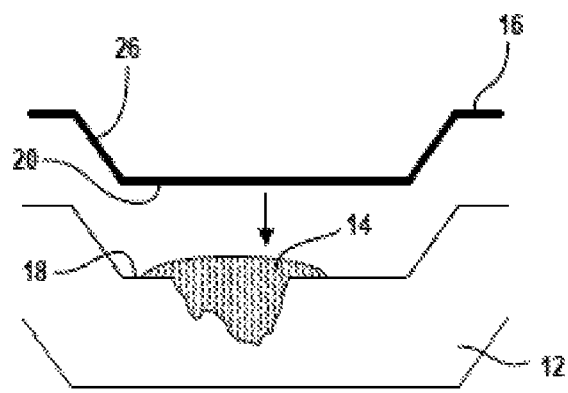
FIG. 1B is an illustration of a defect filled with a pre-polymeric solution, wherein a rigid support structure is being disposed on the defect.

With reference to FIGS. 1A-1D, the current technology provides a method of repairing a defect 10 in a polymeric composite structure 12 (a cross section of the composite structure 12 is depicted in FIGS. 1A-1D). The polymeric composite structure 12 is a section of a vehicle, such as a body panel or a panel defining a floor of a truck bed. The defect 10 can be a cosmetic defect or a structural defect, although as shown in FIG. 1A, the defect 10 is cosmetic in the form of a crack or a pit. As shown in FIG. 1B, the method comprises applying a pre-polymer solution 14 to the defect 10 in the polymeric composite structure 12. In various embodiments, the polymeric composite structure 12 comprises a polyamide-based polymer composite. Enough pre-polymer solution 14 is applied to the defect 10 such that the entire defect 10 becomes filled with the pre-polymer solution 14. In various aspects, enough pre-polymer solution 14 is applied to the defect 10 such that the pre-polymer solution 14 overflows from the defect 10.

The pre-polymer solution 14 comprises at least one monomer and optionally a reinforcing material. As used herein, the "monomer" comprises a pre-polymer moiety that will polymerize to form a polymer. A monomer as used herein may also include several monomers (e.g., comonomers) or oligomer(s). As described further below, the pre-polymer solution 14 may polymerize in situ to generate a polymeric composite material or a polymeric material (when no reinforcing material is present). It is understood that when a polymeric composite material is described herein, a polymeric material may be included in an alternative embodiment, unless explicitly stated otherwise. As used herein, "in situ" polymerization refers to a chemical reaction that causes a monomer to polymerize into a thermodynamically stable polymeric composite material or polymeric material. In certain aspects, the pre-polymer solution 14 forms a "thermoplastic." Particularly suitable thermoplastic polymers include polyamides, such as polyamide 6 that will be discussed further below. In various embodiments, an activator and/or an initiator, i.e., a catalyst, are also provided in the pre-polymer solution 14 for in situ polymerization to occur. The polymeric composite material or polymeric material generated in situ may be the same material as the polymeric composite structure 12 (in other words, that the polymer in the damaged polymeric composite structure is the same as the polymer that is formed from the pre-polymer solution 14), or it may be a different material as the polymeric composite structure 12 (in other words, that the polymer in the damaged polymeric composite structure is a distinct polymer from the polymer formed from the pre-polymer solution 14).

The polymeric composite material may be composed of any fiber-reinforced composite material disclosed in U.S. Patent Publication Nos. 2013/0122262, 2013/0272780, and 2015/0108793, and PCT International Publication Nos. WO 2012/117593, WO 2012/105716, WO 2012/102315, WO 2012/105080, WO 2012/105387, WO 2012/105389, WO 2012/105717, WO 2012/108446 and WO 2012/140793, each of which is respectively incorporated herein by reference in its entirety.

Thus, suitable polymeric composite materials may comprise a polymer matrix or resin reinforced with a reinforcing fiber. Suitable non-limiting examples of fibers include carbon fibers, glass fibers (such as fiber glass or quartz), aramid fibers (such as KEVLAR® para-aramid synthetic fiber and TWARON® para-aramid synthetic fiber), boron fibers, ceramic fibers, polyester fibers, ultra-high molecular weight polyethylene (UHMWPE) fibers, and combinations thereof. The fibers may be provided as fiber mats having interconnecting or contacting fibers or may be randomly distributed individual fibers within the resin matrix. Suitable fibers may include relatively short length fibers (having lengths of ≥about 0.1 mm to ≤about 10 mm), relatively long length fibers (having lengths of ≥about 10 mm to ≤about 100 mm), or continuous fibers (having lengths of ≥about 100 mm), and may include any combinations thereof. Long length fibers can provide good balance of moldability/productivity/mechanical performance. The fibers may be chopped, as well. Suitable polymeric materials include the same polymer matrix or resin as the polymeric composite materials, but do not include reinforcing fibers.

The fibers within the polymeric composite material may be configured in a random-oriented manner, for example, in a substantially two-dimensionally-random oriented or in a specific-direction-oriented manner. In certain variations, a fiber mat may be used with highly planar oriented or uni-directional oriented fibers or a combination thereof. The fiber mat may have a random-oriented fiber for good balance of moldability/productivity/mechanical performance. In certain variations, a random fiber mat can be used. The random mat may include reinforcing fibers having an average fiber length of greater than or equal to about 3 mm to less than or equal to about 100 mm and a thermoplastic resin. Such a random fiber mat is further described in WO 2012/105080 discussed above. In addition, a uni-directional oriented carbon fiber layer may be included in order to enhance local stiffness and strength for the load-carrying support structure.

As discussed above, the polymeric composite material is composed of a reinforcing material dispersed in a polymeric matrix or resin. Likewise, the polymeric material is composed of a polymeric matrix or resin. By way of non-limiting example, the polymer resin may include: polyamide resin (PA6, PA11, PA12, PA46, PA66, PA610), caprolactam resin, polyamide imide resin, vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyether imide resin, polyphenylenesulfide resin, polybenzimidazole resin, polyacetal resin, polycarbonate resin, polyethylene terephthalate resin, polyethylene naphthalate resin, polybutylene terephthalate resin, polyacrylate resin, polyarylethersulfone resin, polyphenylene ether resin, polyphenylene sulfide resin, polysulfone resin, polyether sulfone resin, polyether ether ketone resin, polylactide resin, polycarbonate resin, or any combination or copolymer of these resins. As appreciated by those of skill in the art, the fiber reinforced composite material may further include other ingredients, including other reinforcement materials, functional fillers or additive agents, like organic/inorganic fillers, fire-retardants, anti-ultraviolet radiation agents (UV stabilizers), anti-oxidants, colorants or pigments, such as carbon black powder, mold release agents, softeners, plasticizing agents, surface active agents, and the like. In regard to the colorants or pigments, they may be used to match the color of the polymeric composite material to the polymeric composite structure 12.

In various embodiments, the polymeric composite material, or polymeric material, formed in situ is the same material as the polymeric composite structure or a different polymer as that of the polymeric composite structure. For example, the use of in situ polymerized reinforced polyamide 6 for both bonding (in structural repair) and filling (in cosmetic repair) applications provides several advantages, such as easy operation due to starting materials being in a liquid state, good adhesion with the parent polymeric composite structure, especially when the parent polymeric composite structure is composed of a polyamide, such as polyamide 6, and good mechanical, UV, and abrasion resistance due to the polymerization product being high performance polyamide 6, especially when the polymeric composite structure is composed of reinforced polyamide 6. For the in situ generation of polyamide 6, a suitable activator includes hexamethylene diisocyanate and suitable initiators include aliphatic cyclic amide sodium salts or aliphatic cyclic amide magnesium salts, such as caprolactam magnesium bromide. A typical activator:initiator ratio is from about 0.50 to about 5% by weight. Accordingly, in certain embodiments, the pre-polymer solution includes caprolactam as the monomer, hexamethylene diisocyanate as an activator, and caprolactam magnesium bromide as an initiator for the in situ generation of polyamide 6.

With renewed reference to FIGS. 1A and 1B, the method further comprises disposing a support structure 16 on a surface 18 of the polymeric composite structure 12, such that the support structure 16 is disposed over at least a portion of the surface 18 having defect 10. In some embodiments, the support structure 16 is disposed on the surface 18 of the polymeric composite structure 12 over at least a portion of the defect 10 having the applied pre-polymer solution 14. Thus, the support structure 16 may be in direct contact with the pre-polymer solution 14 and the surface 18 of the polymeric composite structure 12 where the defect 10 is present. The support structure 16 is desirably a rigid material, which in certain embodiments, may be formed of a thermally conductive material. The support structure 16 has a surface 20 that matches the surface 18 of the polymeric composite structure 12. Put another way, when the support structure 16 is disposed on the surface 18 of the polymeric composite structure 12, substantially the entire surface 20 of the support structure 16 is in direct contact with the surface 18 of the polymeric composite structure 12, with the exception for where the pre-polymer solution 14 may overflow from the defect 10, such that a portion of the pre-polymer solution 14 is displaced between the surface 18 of the polymeric composite structure 12 and the surface 20 of the support structure 16. Moreover, in some embodiments the surface 20 of the support structure 16 is grained and/or textured to match the grain and/or texture of the surface 18 of the polymeric composite structure 12. As shown in FIGS. 1A and 1B, the surface 18 of the polymeric composite structure 12 is corrugated. Therefore, the surface 20 of the support structure 16 has a corresponding or matching corrugation that allows the support structure 16 to be conformingly disposed onto the corrugated surface 18 of the polymeric composite structure 12. As discussed further below, the method may also include disposing at least one polymeric composite sheet or patch on a surface of the polymeric composite structure 12 opposite the surface 18 on which the support structure 16 is disposed.

Figure 1C:
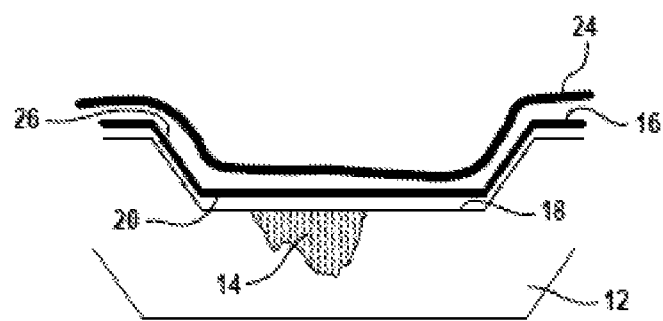
FIG. 1C is an illustration of a heating blanket disposed on the support structure.
Figure 1D:
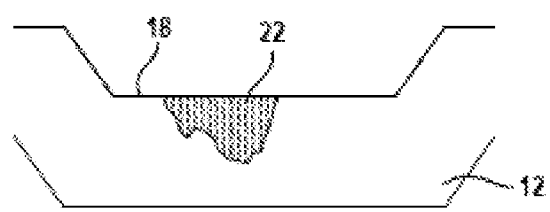
FIG. 1D is an illustration of a repaired defect in the polymeric composite structure shown in FIG. 1A.

After disposing the support structure 16 onto the polymeric composite structure 12, the method includes polymerizing the pre-polymer solution 14, or the monomer within the pre-polymer solution 14, to generate a polymeric composite material 22, as described above, in the defect 10. In certain aspects, the pre-polymer solution 14 comprises a monomer and the process is a polymerizing process to generate a polymer. In other words, the monomer in the pre-polymer solution 14 is polymerized to form a repaired region in the polymeric composite structure 12 comprising a polymer having the reinforcing material distributed therein. In various embodiments, polymerizing may include applying heat or light, such as UV light, through the support structure 16 to the pre-polymer solution 14 to initiate in situ polymerization. Therefore, the support structure 16 is composed of a material that accommodates transfer of heat and/or energy to the pre-polymer solution 14. For example, when heat is applied to initiate the polymerizing, the support structure 16 is composed of a heat conducting material, such as, for example, metal or steel. Therefore, polymerizing by applying heat to the pre-polymer solution 14 includes applying heat to the pre-polymer solution 14 through the support structure 16. In various embodiments, the heat is provided by an oven, an incubator, or by a heating blanket. In FIGS. 1A and 1C, applying heat to the pre-polymer solution 14 through the support structure 16 comprises disposing a heat blanket 24 on an exposed surface 26 of the support structure 16. When light is applied to initiate the polymerizing, the support structure 16 is composed of material that is transparent to the wavelength of light that initiates the polymerization, such as, for example, a transparent glass or plastic. As shown in FIG. 1D, after polymerizing is complete, the heating blanket 24 and support structure 16 are removed to expose a repaired defect 10 on the polymeric composite structure 12, wherein the repaired defect 10 includes the polymeric composite material 22 generated in situ.

In some embodiments, the method further comprises applying pressure to the support structure 16 prior to and during the polymerizing the pre-polymer solution 14, or more specifically, prior to and during the polymerizing of the monomer in the pre-polymer solution 14. The applying pressure may include sealing the polymeric composite structure 12, support structure 16 in vacuum bagging and applying a negative pressure until polymerizing is complete. Accordingly, when a heating blanket 24 is used for applying heat to initiate polymerizing, the heating blanket may also be sealed in the vacuum bagging. Alternatively, if the vacuum bagging conducts heat, the heating blanket 24 may be positioned on an exterior surface of the vacuum bagging such that heat is transmitted through the vacuum bagging and support structure 16 to the pre-polymer solution 14. Likewise, if light is used to initiate polymerizing, the vacuum bagging is transparent to the wavelength of light required for the polymerizing.

In yet other embodiments, the method optionally comprises removing the support structure 16 from the surface 18 of the polymeric composite structure 12. As described above, the surface 20 of the support structure 16 may be grained and/or textured to match the grain and/or texture of the surface 18 of the polymeric composite structure 12. Therefore, when the surface 20 of the support structure 16 is grained and/or textured to match the grain and/or texture of the surface 18 of the polymeric composite structure 12, after the support structure 16 is removed the polymeric composite material 22 generated in the defect 10 has an exposed surface having a grain and/or texture that matches that of the surface 20 of the support structure 16 and the surface 18 of the polymeric composite structure 12. By matching the grain and/or texture of the surface 18 of the polymeric composite structure 12 to the exposed surface of the polymeric composite material 22, the repaired defect 10 filled with the polymeric composite material 22 is seamless and/or undetectable (e.g., difficult to see or feel).

The current technology also provides structures formed according to the above method, including intermediate structures that are formed during performance of the method and final structures that are formed after the method is performed. In certain embodiments, an intermediate structure comprises a polymeric composite structure having a surface with a defect, and a pre-polymer solution comprising a monomer and an optional reinforcing material disposed within at least a portion of the defect. The pre-polymer solution can be any pre-polymer solution described above, and may include, for example, at least one of an initiator and an activator. The intermediate structure can also include a support structure (such as the support structure described above) disposed on the surface and over the defect. When the polymeric composite structure is corrugated, the support structure has a corresponding corrugation. The intermediate structure can also include a heat blanket (such as the heat blanket described above) disposed on the surface and over the defect, or when the intermediate structure includes a support structure, a heat blanket disposed over the support structure. In various embodiments, the intermediate structure also includes vacuum bagging that covers the defect and also the support structure and/or heat blanket when they are included. In other embodiments, the current technology provides a polymeric composite panel having a repaired region, the repaired region comprising a defect filled with a polymer comprising a reinforcing material selected from the group consisting of carbon fibers, glass fibers, chopped fibers, continuous fibers, fabrics, mesh, powder, and combinations thereof, wherein the repaired region may have an exposed surface having a grain or pattern that matches a grain or pattern in an exposed surface of the polymeric composite structure In other variations, an exemplary final structure comprises a polymeric composite structure having a defect, wherein the defect is filled with a polymer composite. The polymer composite can be the same or different polymer composite as the polymeric composite structure. Moreover, the polymer composite can have a surface that is flush with a surface of the polymeric composite structure. Moreover, the surface of the polymer composite can include a grain or pattern that matches a grain or pattern in the surface of the polymeric composite structure.

Figure 2:
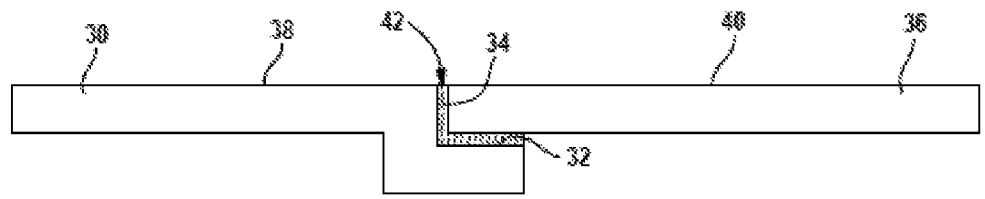
FIG. 2 is an illustration of a second method of repairing a defect in a polymeric composite structure, wherein two polymeric composite structures are bonded together.

The current technology also provides a method of joining two polymeric composite structures together or of repairing a defect in a polymeric composite structure using a polymer polymerized in situ as an adhesive or bonding agent. Whether bonding two structures together or repairing a defect in a structure, both methods include connecting two polymeric composite structures together using a pre-polymer solution. For example, a method of repairing a defect in a polymeric composite structure comprises exposing a portion of a first polymeric composite panel located immediately adjacent to a section of the polymeric composite structure having the defect and removing the section of the polymeric composite structure having the defect. FIG. 2 is an illustration that shows a first polymeric composite panel 30 having a portion 32, which may be, for example, a ledge or overhang. In various embodiments, the first polymeric composite panel 30 comprises a polyamide-based polymer composite. With further reference to FIG. 2, the method further comprises applying a pre-polymer solution 34 comprising a reinforcing material dispersed in a monomer matrix to the portion 32. The pre-polymer solution 34 can be any pre-polymer solution described herein. The method then includes disposing a surface of a new section or second polymeric composite panel 36 onto the pre-polymer solution 34 disposed on the portion 32 of the first polymeric composite panel 30, wherein the second polymeric composite panel 36 replaces the section of the polymeric composite structure having the defect. Therefore, the pre-polymeric solution 34 may take the shape of an "L" between the two panels 30, 36. After the second polymeric composite panel 36 is disposed onto the portion 32 of the first polymeric composite panel 30, the method includes polymerizing the pre-polymer solution 34 to generate a polymeric composite in situ that bonds the second composite panel 36 to the first polymeric composite panel 30.

As described above the method may also include disposing a rigid support structure simultaneously on a top surface 38 of the first polymeric composite panel 30 and a top surface 40 of the second polymeric composite panel 36, such that the support structure spans a space 42 between the two panels 30, 36. The support structure ensures that a smooth, continuous top surface is developed as the polymeric composite is generated in situ in the space 42 between the two panels 30, 36.

Additionally, in some embodiments the method further comprises modifying pressure applied to the second polymeric composite panel 36 and the first polymeric composite panel 30 prior to and during polymerization. In one embodiment, modifying pressure comprises sealing the second polymeric composite panel 36 and the first polymeric composite panel 30 in vacuum bagging and drawing a negative pressure until polymerizing is completed. In other variations, a pressure may be applied during the polymerization process.

The current technology also provides structures formed according to this method, including intermediate structures that are formed during performance of the method and final structures that are formed after the method is performed. In various embodiments, an intermediate structure comprises a first polymeric composite panel having an overhang or ledge at one end, a pre-polymer solution comprising a monomer and an optional reinforcing material disposed on the overhang or ledge, and a second polymeric composite panel disposed on the overhang or ledge, such that the first polymeric composite panel and the second polymeric composite panel have top surfaces that are substantially flush with each other. A line of the pre-polymer solution can be included between the first and second polymeric composite structures. The pre-polymer solution can be any pre-polymer solution described above, and may include, for example, at least one of an initiator and an activator. The intermediate structure can also include a support structure (such as the support structure described above) disposed on the surfaces of the first and second polymeric composite panels and over the line of pre-polymer solution. When the polymeric composite structure is corrugated, the support structure has a corresponding corrugation. The intermediate structure can also include a heat blanket (such as the heat blanket described above) disposed on the surfaces and over the line of the pre-polymer solution, or when the intermediate structure includes a support structure, a heat blanket disposed over the support structure. In various embodiments, the intermediate structure also includes vacuum bagging that covers the line of pre-polymer solution and also the support structure and/or heat blanket when they are included.

An exemplary final structure comprises a first polymeric composite panel having a ledge or overhang, a second polymeric composite panel having an end disposed over the ledge or overhang and a polymer composite disposed between the first and second polymeric composite panels. The polymer composite can be the same or different polymer composite as the polymeric composite panels. Moreover, the polymer composite can have a surface that is flush with surfaces of the polymeric composite panels. Moreover, the surface of the polymer composite can include a grain or pattern that matches a grain or pattern in the surfaces of the polymeric composite panels.

The current technology also provides a method of repairing a defect in a polymeric composite structure, such as a structural defect. With reference to FIGS. 3 and 4, the method comprises applying a pre-polymer solution 50 comprising a monomer and an optional reinforcing material to a defect 52 in a polymeric composite structure 54. In various embodiments, the polymeric composite structure 54 comprises a polyamide-based polymer composite. The pre-polymer solution 50 is any pre-polymer solution described herein. When the defect 52 is a hole, in various embodiments the method includes disposing a replacement section or piece of a polymeric composite material 56 within the hole such that a channel 58 is defined between a first edge 60 of the replacement piece of a polymeric composite material 56 and a second edge 62 of the polymeric composite structure 54 that defines the hole. The channel 58 is filled with the pre-polymer solution 50 after the applying.

In some embodiments, the structural defect is a large crack that spans from a first surface 64 of the polymeric composite structure 54 to a second surface 66 of the polymeric composite structure 54, wherein the first surface 64 is opposite the second surface 66. Here, a portion of the polymeric composite structure 54 may be removed to generate a hole in the polymeric composite structure 54. At this point, the hole is treated as described above.

After the applying a pre-polymer solution 54, the method includes disposing a first patch 68 onto the first surface 64 of the polymeric composite structure 54, such that the patch 68 spans the defect 52. In various embodiments, the first patch 68 is a first polymeric composite sheet or a first plurality of polymeric composite sheets. In other embodiments, the first patch 68 is at least one sheet of metal, steel, fiber glass, or plastic. The first patch 68 is disposed on the first surface 64 of the polymeric composite structure 54 such that it displaces a portion of the pre-polymer solution 50 between the first surface 64 of the polymeric composite structure 54 and the first patch 68.

Then, the method comprises polymerizing the monomer in the pre-polymer solution 50 to generate a polymer composite in situ that bonds the replacement polymeric composite material 56 and the patch 68 to the polymeric composite structure 54. Polymerizing is performed by any method described herein, including by applying heat or light to the pre-polymer solution. For example, heat may be applied through the patch 68 or directly to the pre-polymer solution 50 with a heating blanket. Additionally, in various aspects the method further comprises modifying pressure on the polymeric composite structure 54, during the polymerizing. Modifying pressure may comprise, for example, sealing the polymeric composite structure 54 in vacuum bagging and drawing a negative pressure or vacuum until polymerization is complete.

In various embodiments, and with reference to FIG. 3, the method further includes disposing a second patch 70 to the second surface 66 of the polymeric composite structure 54 that spans the defect, such that the patch 70 spans the defect 52 and is opposite the first patch 68. In various embodiments, the second patch 70 is a second polymeric composite sheet or a second plurality of polymeric composite sheets. In other embodiments, the second patch 70 is at least one sheet of metal, steel, fiber glass, or plastic. The second patch 70 can be the same material or a different material as the first patch 68. The second patch 70 is disposed on the second surface 66 of the polymeric composite structure 54 such that it displaces a portion of the pre-polymer solution 50 between the second surface 66 of the polymeric composite structure 54 and the second patch 70. When heating is required to initiate in situ polymerization of the pre-polymer solution 50, a heating blanket may be disposed on at least one of the first patch 68 and the second patch 70. Disposing the first patch 68 and the second patch 70 on opposite sides of the defect 52 on the polymeric composite material 54 is most desirable when neither patch 68, 70 will be located in a visible area.

When the defect 52 is located in an area that is visible, a patch on a visible surface of the polymer composite material may not be desirable. Therefore, in some embodiments, and with reference to FIG. 4, the method further includes disposing a support structure 72 on the second surface 66 of the polymeric composite structure 54, such that the support structure 72 is in direct contact with the pre-polymer solution 50 and the second surface 66 of the polymeric composite structure 54. In some embodiments, the support structure 72 is disposed on the surface 66 of the polymeric composite structure 54 over at least a portion of the defect 52 having the applied pre-polymer solution 50. The support structure 72 has a surface 74 that matches the second surface 66 of the polymeric composite structure 54. Put another way, when the support structure 72 is disposed on the second surface 66 of the polymeric composite structure 54, substantially the entire surface 74 of the support structure 72 is in direct contact with the second surface 66 of the polymeric composite structure 54, with the exception for where the pre-polymer solution 50 may overflow from the defect 52, such that a portion of the pre-polymer solution 52 is displaced between the second surface 66 of the polymeric composite structure 54 and the surface 72 of the support structure 70. Moreover, in some embodiments the surface 74 of the support structure 72 is grained and/or textured to match the grain and/or texture of the second surface 66 of the polymeric composite structure 54. As shown in FIG. 4, the second surface 66 of the polymeric composite structure 54 is corrugated. Therefore, the surface 72 of the support structure 70 has a corresponding or matching corrugation that allows the support structure 70 to be conformingly disposed onto the corrugated second surface 66 of the polymeric composite structure 54. Polymerizing is then performed after the rigid support structure 72 is disposed on the second surface 66 of the polymeric composite structure 54 with, for example, a heat blanket, as described above.

In some embodiments, the method optionally comprises removing the support structure 74 from the second surface 66 of the polymeric composite structure 54. As described above, the surface 74 of the support structure 72 may be grained and/or textured to match the grain and/or texture of the second surface 66 of the polymeric composite structure 54. Therefore, when the surface 74 of the support structure 72 is grained and/or textured to match the grain and/or texture of the second surface 66 of the polymeric composite structure 54, after the support structure 72 is removed the polymer composite generated in situ has an exposed surface having a grain and/or texture that matches that of the surface 74 of the support structure 72 and the second surface 66 of the polymeric composite structure 54. By matching the grain and/or texture of the second surface 66 of the polymeric composite structure 54 to the exposed surface of the polymer composite, the repaired defect 52 filled with the polymer composite is difficult to see or feel.

The current technology also provides structures generated according to the above method, including intermediate structures that are generated during performance of the method and final structures that are generated after the method is performed. In various embodiments, an intermediate structure comprises a polymeric composite structure having a defect, such as a hole or crack that extends form a first surface to an opposing second surface of the polymeric composite structure. The intermediate structure also includes a pre-polymer solution comprising a monomer and an optional reinforcing material disposed within at least a portion of the defect. The pre-polymer solution can be any pre-polymer solution described above, and may include, for example, at least one of an initiator and an activator. The intermediate structure can also include a patch disposed on the first surface and/or the second surface, and over the defect. The intermediate structure can also include a support structure disposed on the first and/or second surface, spanning the defect. When the polymeric composite structure is corrugated, the support structure has a corresponding corrugation. The intermediate structure can also include a heat blanket (such as the heat blanket described above) disposed on a surface and over the defect, or when the intermediate structure includes a support structure, a heat blanket disposed over the support structure. In various embodiments, the intermediate structure also includes vacuum bagging that covers the defect and also the support structure and/or heat blanket when they are included. An exemplary final structure comprises a polymeric composite structure having a defect, wherein the defect is filled with a polymer composite. The polymer composite can be the same or different polymer composite as the polymeric composite structure. Moreover, the polymer composite can have a surface that is flush with first and second opposing surfaces of the polymeric composite structure. Moreover, the surface of the polymer composite can include a grain or pattern that matches a grain or pattern in the surface of the polymeric composite structure. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of repairing a defect in a polymeric composite structure, the method comprising:
    applying a pre-polymer solution comprising a reinforcing material, a monomer, and at least one of an initiator or an activator to the defect in the polymeric composite structure;
    disposing a thermally conductive support structure on a first surface of the polymeric composite structure over at least a portion of the defect having the applied pre-polymer solution; and
    applying heat through the thermally conductive support structure to the pre-polymer solution to induce polymerization of the monomer and to form a repaired region in the polymeric composite structure comprising a polymer having the reinforcing material distributed therein,
    wherein the thermally conductive support structure facilitates a smooth, continuous surface between the first surface of the polymeric composite structure and the repaired region, and
    wherein the polymerization of the monomer is facilitated by the heat and at least one of the initiator or the activator.

2. The method according to claim 1, wherein the pre-polymer solution comprises an initiator and an activator, and wherein the monomer is caprolactam, the activator is hexamethylene diisocyanate, and the initiator is caprolactam magnesium bromide.

3. The method according to claim 1, wherein the polymeric composite structure has a corrugated surface, and disposing the thermally conductive support structure on the first surface of the polymeric composite structure comprises disposing a rigid thermally conductive support structure having a corrugated surface that matches the corrugated surface of the polymeric composite structure.

4. The method according to claim 1, further comprising:
    applying pressure to the thermally conductive support structure prior to and during the polymerization of the monomer in the pre-polymer solution.

5. The method according to claim 1, wherein the applying heat comprises disposing a heat blanket on an exposed surface of the thermally conductive support structure.

6. The method according to claim 1, wherein the polymeric composite structure comprises a polyamide-based polymer composite and the polymerization of the monomer in the pre-polymer solution generates a polymer comprising polyamide 6 in situ.

7. The method according to claim 1, further comprising:
    disposing at least one polymeric composite sheet on a surface of the polymeric composite structure opposite the first surface on which the thermally conductive support structure is disposed.

8. The method according to claim 1, wherein the reinforcing material is selected from the group consisting of carbon fibers, glass fibers, chopped fibers, continuous fibers, fabrics, mesh, powder, and combinations thereof.

9. The method according to claim 1, further comprising:
    removing the thermally conductive support structure from the first surface of the polymeric composite structure after the repair region is formed.

10. The method according to claim 1, further comprising, prior to the applying heat, disposing a first patch onto a second surface of the polymeric composite structure that spans the defect, the second surface being opposite the first surface.

11. The method according to claim 10, further comprising, prior to the disposing the thermally conductive support structure on the first surface, disposing a second patch to the first surface of the polymeric composite structure that spans the defect.

12. The method according to claim 10, wherein the defect is a hole and the method further comprises:
    disposing a piece of a polymeric composite material within the hole such that a channel is defined between a first edge of the piece of a polymeric composite material and a second edge of the polymeric composite structure that defines the hole,
    wherein the channel is filled with the pre-polymer solution after the applying.

13. The method according to claim 10, wherein polymeric composite structure is corrugated, and the disposing a support structure on the first surface of the polymeric composite structure comprises disposing the thermally conductive support structure having a corrugated surface that matches the corrugated polymeric composite structure.

14. A method of repairing a defect in a corrugated first surface of a polymeric composite structure, the method comprising:
    applying a pre-polymer solution consisting essentially of caprolactam, hexamethylene diisocyanate, caprolactam magnesium bromide, and optionally a reinforcing material to the defect in the polymeric composite structure;
    disposing a thermally conductive support structure having a corrugated surface that matches the corrugated first surface of the polymeric composite structure directly onto the corrugated first surface of the polymeric composite structure and over the defect having the applied pre-polymer solution; and
    applying heat through the thermally conductive support structure to the pre-polymer solution to induce polymerization of the caprolactam and to form a repaired region in the polymeric composite structure,
    wherein the thermally conductive support structure facilitates a smooth, continuous surface between the first surface of the polymeric composite structure and the repaired region, and
    wherein the polymerizing the caprolactam is facilitated by the hexamethylene diisocyanate and the caprolactam magnesium bromide.

15. The method according to claim 14, wherein the defect is a cosmetic defect that does not extend from the corrugated first surface to a second opposing surface, wherein the cosmetic defect is selected from the group consisting of a crack, a groove, and a pit.

16. The method according to claim 14, wherein the defect is a structural defect that extends from the corrugated first surface to a second opposing surface.

17. The method according to claim 14, wherein the applying heat comprises:
    disposing a heat blanket on an exposed surface of the thermally conductive support structure.

18. The method according to claim 1, wherein the thermally conductive support structure comprises a grain, texture, or combination thereof on a surface of the thermally conductive support structure that contacts the pre-polymer solution, the grain texture, or combination thereof matching a complementary grain, texture, or combination thereof on the first surface of the polymeric composite structure and that gets transferred to the polymer during the polymerization.

* * * * *